(12) United States Patent
Strugalski

(10) Patent No.: US 8,404,801 B1
(45) Date of Patent: Mar. 26, 2013

(54) $CO_2$ CLEANING

(75) Inventor: Greg Strugalski, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/416,032

(22) Filed: Mar. 9, 2012

(51) Int. Cl.
*C08F 6/00* (2006.01)
*C08G 64/00* (2006.01)
(52) U.S. Cl. ................................................ 528/483
(58) Field of Classification Search ............... 528/483
See application file for complete search history.

(56) References Cited

U.S. PATENT DOCUMENTS
7,670,496 B2 * 3/2010 Saga et al. .................... 216/13

FOREIGN PATENT DOCUMENTS
JP    2002-320929    * 11/2001

* cited by examiner

*Primary Examiner* — Terressa Boykin
(74) *Attorney, Agent, or Firm* — Cooper Legal Group, LLC

(57) ABSTRACT

An apparatus and methods for removing contaminants from substances are provided. The apparatus includes a treatment vessel, a pump, and a means to suspend a contaminated substance within a flow of a low surface tension solvent. Circuitous piping is provided to cycle the flow of the solvent through the treatment vessel. The methods include exposing a contaminated substance to a flow of low surface tension solvent that removes the contaminant from the substance and transports it away from the substance. In further examples, the pressure and temperature within the processing system can be increased to put the solvent into a supercritical phase.

20 Claims, 4 Drawing Sheets

$CO_2$ CLEANING

BACKGROUND OF THE INVENTION

1. Field of the Invention

The invention relates to removing contaminants from substances, and specifically relates to removing contaminants from substances using a low surface tension solvent.

2. Discussion of Prior Art

Undesired contaminants from manufacturing processes can remain in finished goods or intermediate goods. It can often be beneficial to remove these contaminants from the goods either before sale to an end customer or before a subsequent manufacturing operation. Two examples of these types of goods or substances are $B^{10}$ powder and polytetrafluoroethylene (PTFE) fine powder resin.

Boron powder is used as a primary component of boron coatings in numerous applications. Such applications include boron coatings used for neutron detectors used for monitoring at national border portals, nuclear power plants, etc. Some of these applications are adversely affected by contaminants within the boron powder, as the contaminants can be detrimental to boron coating applications and can result in degraded boron coating properties.

Some manufacturing processes of PTFE leave residues on the surface of the PTFE. Some of these residues are surfactants used in the manufacturing process to increase the water resistance of the PTFE. It is often desirable to remove these residues from the PTFE fine powder resin either prior to a sale of the material to a consumer or prior to a subsequent manufacturing step.

Contaminated boron powder and contaminated PTFE can result in costly missteps in the manufacturing process. Some previous methods of treating contaminated substances include rinsing the substance with chemicals such as hexane, methylene chloride, and ethylene glycol, each in combination with filters and/or centrifuges. Other methods of removing contaminants include firing the substance to "burn-off" the contaminants. Therefore, there is a need for an improved apparatus and method of removing contaminants from the surfaces of substances.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a method of removing contaminants from substances. The method includes providing a contaminated substance, the substance being comingled with a contaminant. The method further includes exposing the contaminated substance to a low surface tension solvent. The method also includes circulating the low surface tension solvent around the exposed surfaces of the contaminated substance. The method also includes removing the contaminant from the substance.

In accordance with another aspect, the present invention provides a method of removing contaminants from substances. The method includes providing a contaminated substance, the substance being comingled with a contaminant. The method includes placing the contaminated substance within a treatment vessel. The method further includes exposing the contaminated to a low surface tension solvent. The method also includes increasing the pressure of the low surface tension solvent within the treatment vessel. The method further includes circulating the low surface tension solvent around the exposed surfaces of the contaminated substance. The method also includes removing the contaminant from the substance. The method further includes transporting the contaminant away from the substance by suspending the contaminant in a flow of the low surface tension solvent. The method also includes reducing the pressure of the low surface tension solvent within the treatment vessel to precipitate the dissolved contaminant.

In accordance with another aspect, the present invention provides a processing system for removing contaminants from substances. The processing system includes a treatment vessel to contain an amount of a contaminated substance. The processing system further includes a pump in fluid communication with the treatment vessel to circulate and pressurize a low surface tension solvent. The processing system also includes a means of suspending the contaminated substance within the treatment vessel. The means of suspending the contaminated substance places the contaminated substance within the fluid flow of the low surface tension solvent. The processing system further includes a circuitous piping arrangement that permits a flow of the low surface tension solvent to be cycled through the treatment vessel.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
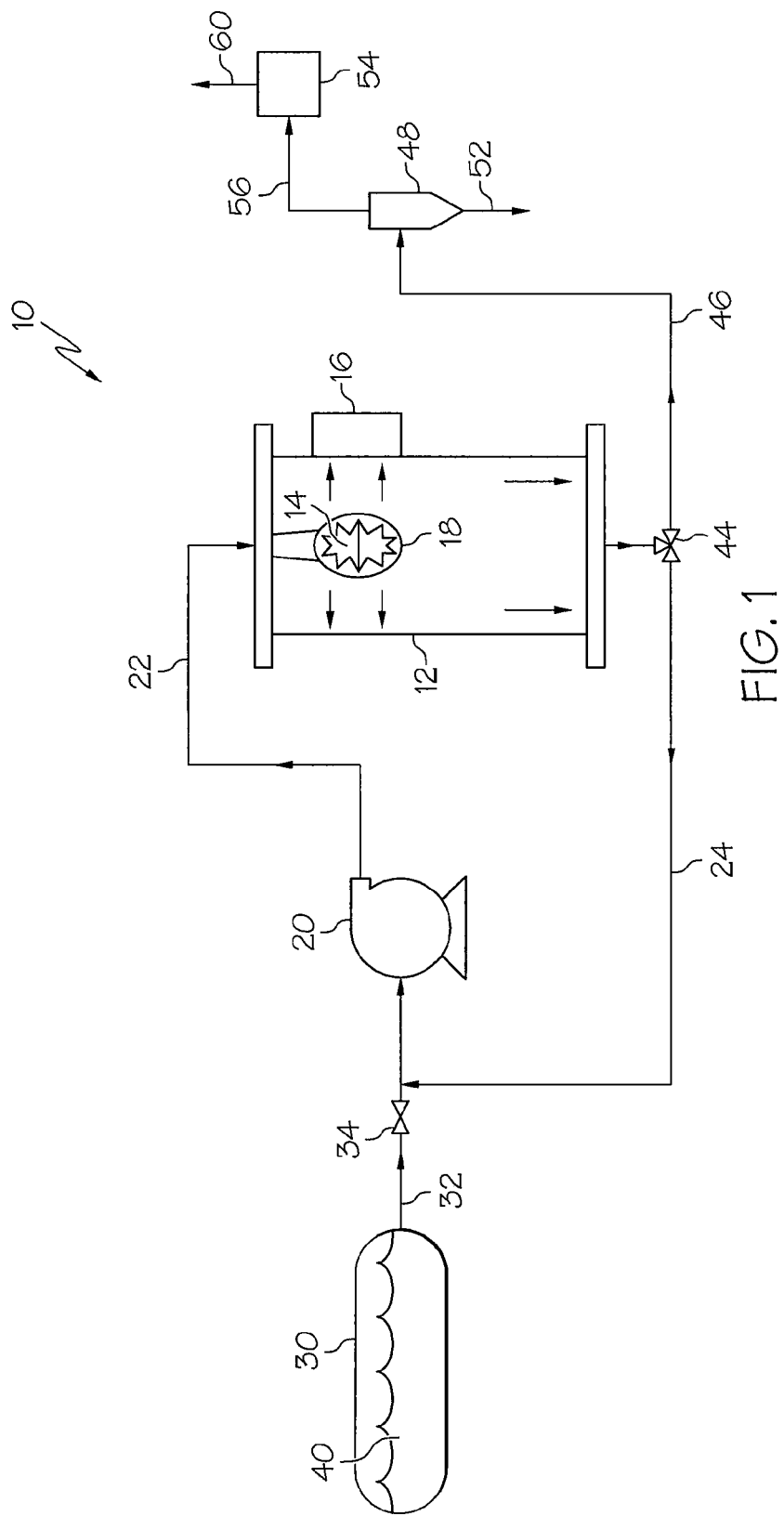
FIG. 1 is a schematic representation of a processing system to remove contaminants from substances in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

A schematic representation of an example processing system 10 for removing contaminants from contaminated substances is shown within FIG. 1. It is to be appreciated that FIG. 1 merely shows one example of possible structures/configurations etc., and that other examples are contemplated within the scope of the present invention.

The processing system 10 includes a treatment vessel 12 for treating a contaminated substance 14. The contaminated substance 14 can include any number of substances that are comingled with an amount of one or more undesired contaminants. The contaminated substance 14 can be an inorganic substance such as boron. In one particular example, the boron can be a powder predominantly consisting of $B^{10}$. Contaminated $B^{10}$ powder can include contaminants from various sources. For example, jet milled boron powder has been found to be susceptible to contamination from the air supply used in a milling process. Specifically, boron powder contaminants can include lubrication oil from an air compressor when compressed air is used to operate a jet mill. Other example contaminants are polymeric liner material from the jet mill, adhesive materials used to attach the polymeric liner material to a jet mill interior wall, and metal particles from the jet mill interior wall.

The contaminated substance 14 can also be an organic substance such as PTFE fine powder resin and expanded PTFE (ePTFE) fine powder resin. PTFE can be manufactured using processes that include the use of a surfactant or other processing aids. After the PTFE manufacturing process, the surfactant or other processing aids can remain on the surface of the PTFE as an undesirable contaminant. Other contaminants resulting from the PTFE manufacturing process are also contemplated.

The treatment vessel 12 can be in the form of a pressure vessel capable of providing and withstanding elevated internal pressure and varying internal temperature in comparison to ambient pressure and temperature outside of the treatment vessel 12. In one example, the treatment vessel 12 can provide and withstand internal pressure of approximately $3.2 \times 10^7$ Pa (320 bars) and internal temperature of approximately 40° C. The treatment vessel 12 is sized appropriately to treat a desired amount of contaminated substance 14. The treatment vessel 12 can have an external heater 16 to maintain the walls of the treatment vessel 12 at a predetermined temperature. It is to be appreciated that the interior volume of the treatment vessel 12 can be secured so that little or no ambient atmosphere can enter into the treatment vessel 12 during operation of the processing system 10.

The treatment vessel 12 is in fluid communication with a supply and circulation pump 20 by line 22. The treatment vessel 12 is located in a fluid circulation loop connected by line 24. The treatment vessel 12 and any or all of the lines can be individually heated or cooled to maintain a desired temperature of a fluid operating within individual components of the processing system 10. The treatment vessel 12 includes a means of suspending the contaminated substance 14 within the treatment vessel 12. In one example, the means of suspending the contaminated substance 14 in a fine mesh bag composed of ePTFE. For simplicity, the fine mesh bag will be referred to as membrane 18. The membrane 18 is permeable to a fluid flow within the treatment vessel 12 while containing a contaminated substance 14 within the membrane 18. In order to foster fluid flow through the membrane 18 while retaining the contaminated substance 14 within the membrane 18, an optimal pore size for the material forming the membrane 18 can be selected. In one example, the maximum pore size for the membrane 18 material is 0.5 micrometers ($1.97 \times 10^{-5}$ inches) for a particular powdered contaminated substance. It is to be appreciated that varying optimal pore sizes can be determined when the contaminated substance 14 is composed of varying particle sizes.

A fluid flow is introduced into the treatment vessel 12 and the interior space within the membrane 18 either with a flow directed into an opening in the membrane 18 and/or by passing from the exterior of the membrane 18 to the interior of the membrane 18. The fluid flow then interacts with the contaminated substance 14, and then passes through the membrane 18 to the volume exterior to the membrane 18. The direction of the fluid flow is schematically represented by the arrows within the treatment vessel 12. It is to be appreciated that the membrane 18 is supported in the treatment vessel 12 so the membrane 18 does not contact the interior of the treatment vessel 12 and fluid flow can occur around the membrane 18. It will be apparent that the treatment vessel 12 could be oriented in a vertical direction or any other orientation.

Pump 20 is also connected to a solvent storage tank 30 through line 32 and valve 34. The storage tank 30 houses a quantity of low surface tension solvent 40 under pressure and can be maintained at a desired temperature to help meet the operating requirements of the processing system 10. In one example, the low surface tension solvent is a single solvent such as carbon dioxide ($CO_2$). In another example, the low surface tension solvent 40 can further include a co-solvent such as methyl ethyl ketone (MEK).

In one example use of the processing system 10, the fluid flow of the low surface tension solvent 40 can remove contaminants from the contaminated substance 14 with a washing or rinsing action. As the flow of low surface tension solvent 40 comes into contact with the contaminants on the surfaces of the contaminated substance 14, the fluid flow can urge the contaminants away from the contaminated substance 14 and suspend the contaminants within the fluid flow. This mechanical washing or rinsing action can completely or at least partially remove contaminants from the contaminated substance 14 in order to clean the contaminated substance 14. The washing or rinsing action is one example of removing contaminants from the substance.

In another example use of the processing system 10, it has been found that a fluid such as a low surface tension solvent 40 can dissolve contaminants that are comingled with the contaminated substance 14. The resulting solution of the dissolved contaminants and the low surface tension solvent 40 is capable of wetting powder particles of the contaminated substance 14 and entering pores in the membrane 18. The solution with dissolved contaminants has a surface tension, viscosity, and relative contact angle that permit the dissolved contaminants to be easily carried away from the contaminated substance 14 and through the pores of the membrane 18. Dissolving the contaminants is another example of removing contaminants from the substance.

Figure 2:
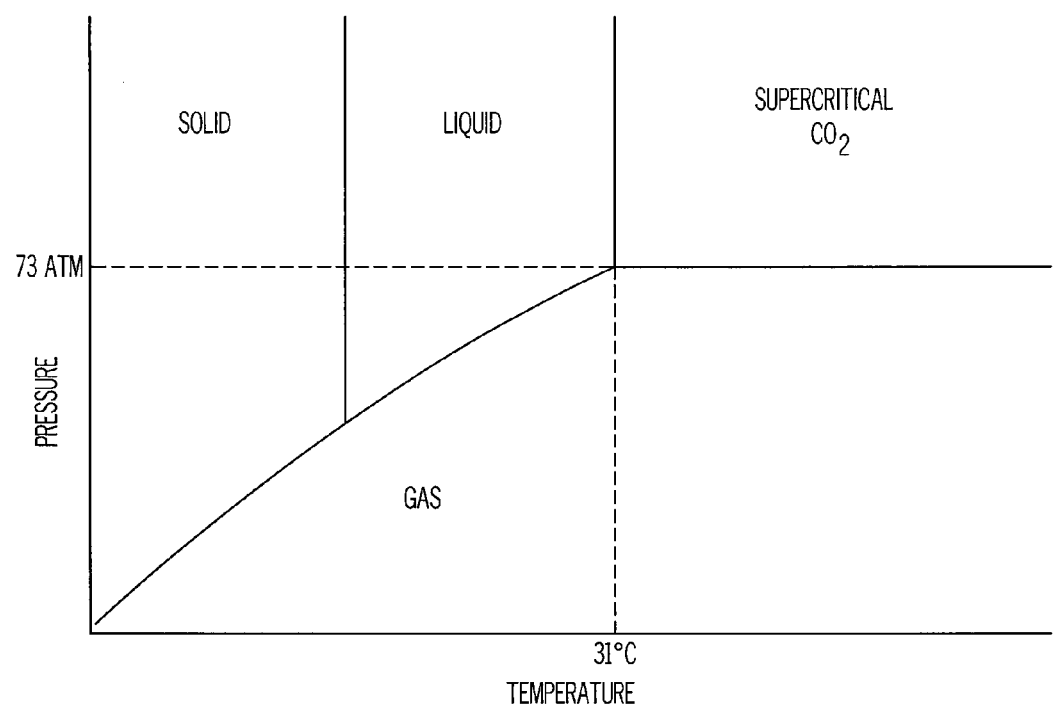
FIG. 2 is a graphical representation of various states of a fluid used in the removal of contaminants of the present invention.

In one example, the low surface tension solvent is $CO_2$ in a supercritical phase as illustrated in FIG. 2. In one specific example, the surface tension of the liquid $CO_2$ solution is less than 5.0 dynes/cm. Within a more specific example, the surface tension of the liquid $CO_2$ solution solution is less than 1 dyne/cm (e.g., 0.5 dyne/cm). Within an even more specific example, the surface tension of supercritical $CO_2$ ($SCCO_2$) solution is less than 0.1 dyne/cm. Such examples provide abilities of the $SCCO_2$ to pass through the small size pores of the membrane 18. $SCCO_2$ also has a viscosity of less than about 0.1 centipoise. The viscosity and surface tension of the solution are extremely low, resulting in very little resistance to flow, thus, lending itself to the possibility of entering even the smallest pores or areas, such as through pores in the membrane 18 and through interstitial spaces such as nooks, crannies, cracks, and voids between the powder particles of the contaminated substance 14.

Particularly attractive properties are provided by $SCCO_2$ in that it behaves like a gas and a liquid at the same time. When it behaves like a liquid, it can dissolve material and act as a solvent as described above. $SCCO_2$ remains a gas, but has a high density of about 0.8 grams/cc so that the $SCCO_2$ functions like a solvent. The $CO_2$ can be obtained from sources that create it as a by-product and can be repeatedly recovered and re-used. When $SCCO_2$ behaves like a gas, it has very low viscosity and surface tension so it can enter very small spaces, such as the relatively small pores in the membrane 18 or the interstitial spaces between the powder particles of the contaminated substance.

Returning to FIG. 1, the processing system 10 can further include particulate collection equipment. In one example, the particulate collection equipment can be in selective fluid communication with the treatment vessel via valve 44 and line 46. The valve 44 can be a three-way valve that selectively routes the flow of low surface tension solvent 40 flow from the treatment vessel to either line 24, returning the low surface tension solvent 40 or to line 46, sending the flow of low surface tension solvent 40 to the particulate collection equipment. The particulate collection equipment can include a cyclone 48. The cyclone 48 can include any of a number of commercially available cyclones that separate particulate matter from a fluid flow where the particulate matter is then collected at collection point 52. The particulate collection equipment can further include a bag house 54. The bag house 54 is in fluid communication with the flow of low surface tension solvent 40 exiting the cyclone 48 via line 56. The bag house 54 can then collect very fine particulate matter that did not separate from the flow of low surface tension solvent 40 at the cyclone 48. The flow of low surface tension solvent 40 can then exit the bag house at point 60 where the low surface tension solvent 40 can be vented to atmosphere, stored in a container, or recovered for re-use. It is to be appreciated that the above described processing system 10 can include numerous other components to meet the operating requirements of the system. Additionally, the processing system 10 can be controlled manually or it can be controlled automatically by an electronic control system, pneumatic control system, or the like. A programmable controller can also be included in the processing system 10 to provide as much automatic control as is desired. It is also to be appreciated that laboratory scale equipment, based on the processing system 10, was used in the example described below.

Figure 3:
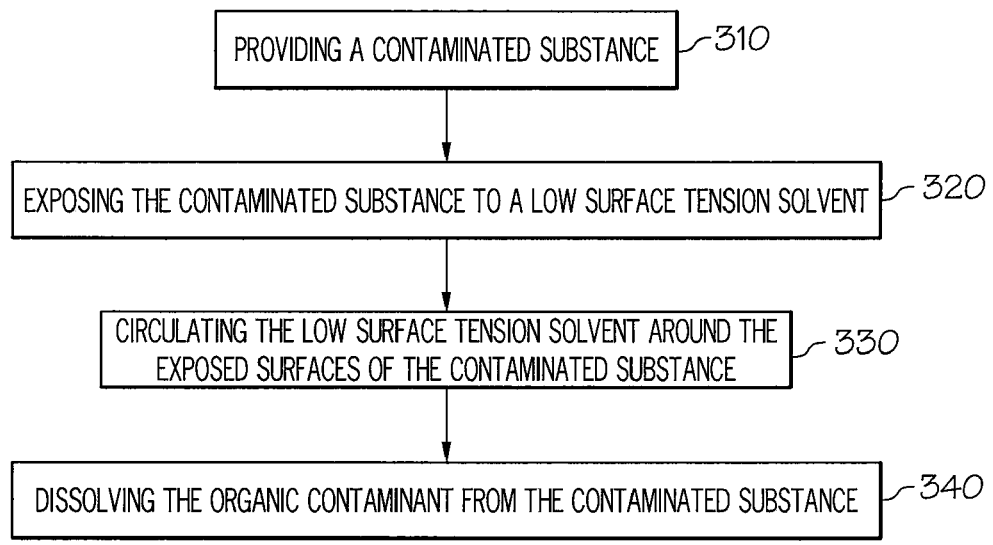
FIG. 3 is a top level flow diagram of an example method of removing contaminants from substances in accordance with an aspect of the present invention.

An example method of removing contaminants from substances is generally described in FIG. 3. The method can be performed with the processing system 10 shown in FIG. 1. The method includes the step 310 of providing a substance that has been contaminated with a contaminant. In one example, the contaminated substance 14 is powdered boron, in particular, powdered boron that is predominantly $B^{10}$. As previously discussed, undesired contaminants may have accumulated on the $B^{10}$ powder from lubrication oil suspended in a quantity of compressed air used to operate a jet mill that reduced the particle size of the $B^{10}$. Alternatively, the contaminants may have eroded from the polymeric liner material of the jet mill interior wall and attached to the surface of the $B^{10}$ powder particles or any number of other sources. In another example, the contaminated substance 14 is a fine powder resin such as PTFE. PTFE can be manufactured using processes that can include the use of a surfactant or other processing aids. After the PTFE manufacturing process, the surfactant or other processing aids can remain on the surface of the PTFE as an undesirable contaminant. Other contaminants resulting from the PTFE manufacturing process are also contemplated.

The method includes the step 320 of exposing the contaminated substance 14 to a low surface tension solvent 40. The low surface tension solvent 40 can include a single solvent or it can include a first solvent working with a co-solvent. In one example, the low surface tension solvent 40 is $CO_2$. The method further includes the step 330 of circulating the low surface tension solvent 40 around the exposed surfaces of the contaminated substance 14.

The method also includes the step 340 of removing the contaminant from the contaminated substance 14. The low surface tension solvent 40 removes the contaminants and places them in suspension within the flow of the low surface tension solvent 40 in order to flush the contaminants away from the contaminated substance 14. With each pass of the low surface tension solvent 40 over the contaminated substance 14, the concentration of the contaminants is reduced.

Figure 4:
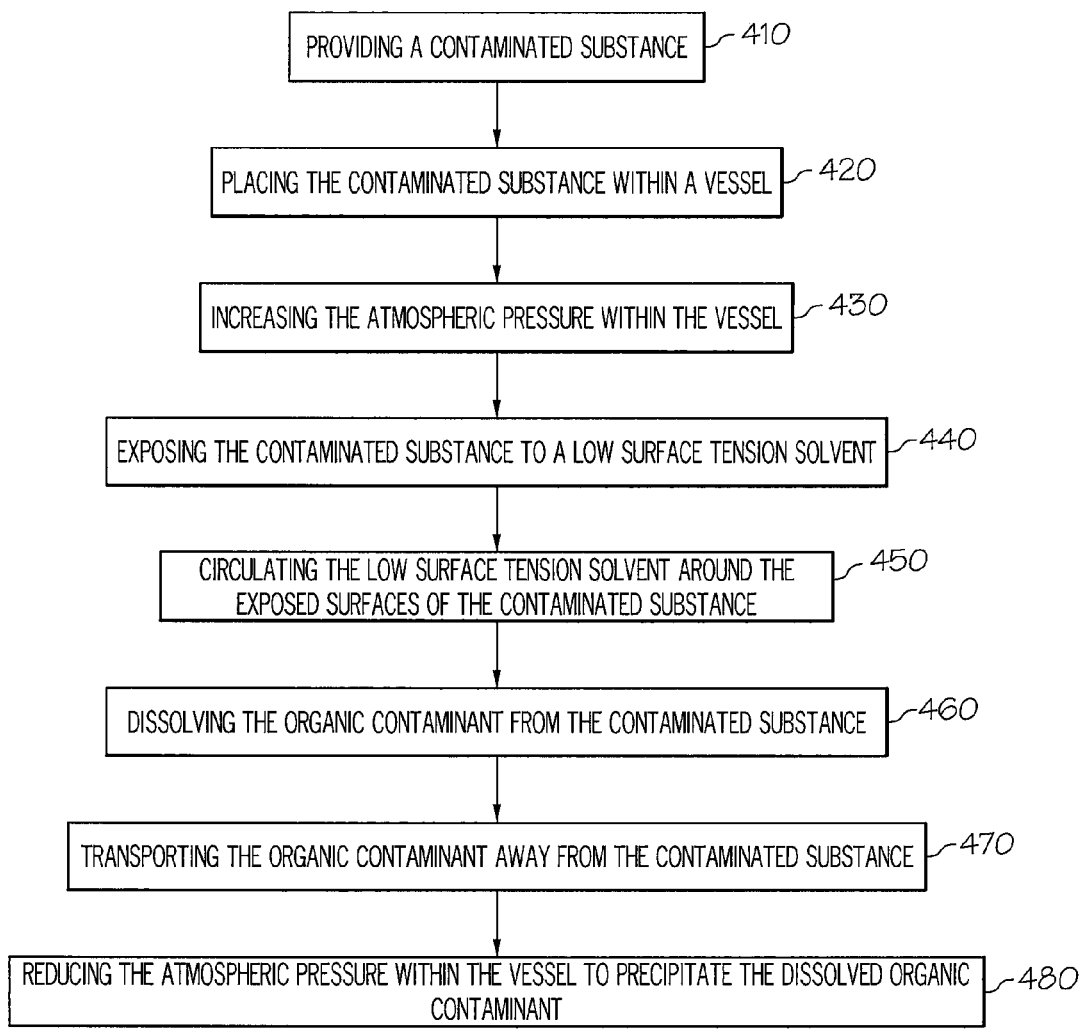
FIG. 4 is a top level flow diagram of an example method of removing contaminants from substances in accordance with an aspect of the present invention

Another example method of removing contaminants from substances is generally described in FIG. 4. The method includes the step 410 of providing a substance that has been contaminated with a contaminant. As described above, examples of the contaminated substance 14 include, but are not limited to, powdered boron and PTFE fine powder resin. The method further includes the step 420 of placing the contaminated substance 14 within a treatment vessel 12. The placement of the contaminated substance 14 within the treatment vessel 12 can include placing the contaminated substance 14 within a membrane 18.

The method also includes the step 430 of exposing the contaminated substance 14 to a low surface tension solvent 40. In one example, the low surface tension solvent 40 is $CO_2$. A flow of low surface tension solvent 40 can be inserted directly to the interior of the membrane 18, or it can permeate through the pores of the membrane 18 in order to reach the exposed surfaces of the contaminated substance 14. The physical properties of the low surface tension solvent 40 as described above allow it to easily penetrate the relatively small pore size of the membrane 18 and move through the interstitial spaces of the contaminated substance 14. Force provided by the flow of the low surface tension solvent 40 may move individual particles or portions of the contaminated substance 14 relative to other individual particles or portions while remaining within the interior of the membrane 18. This allows the flow of low surface tension solvent 40 to reach an increased surface area of the contaminated substance 14, thereby increasing the effectiveness of the contaminant removal process. While not necessary, the application of an agitation force such as a mechanical washing action can be beneficial.

The method further includes the step 440 of increasing the atmospheric pressure within the treatment vessel. The increased atmospheric pressure can be used to place the $CO_2$ into a supercritical phase. While in the supercritical phase, $SCCO_2$ is held at or above its critical temperature and critical pressure, expanding to fill the treatment vessel 12 like a gas, but having the density like that of a liquid. The physical properties of the $SCCO_2$ enable it to easily penetrate the relatively small pores of the membrane 18 and remove the contaminants on the exposed surfaces of the contaminated substance 14. The method also includes the step 450 of circulating the low surface tension solvent 40 around the exposed surfaces of the contaminated substance 14. The circulation can be accomplished by several means including a looped pipe line that recirculates the low surface tension solvent 40 or, alternatively, circulating the low surface tension solvent 40 within the treatment vessel 12.

The method further includes the step 460 of removing the contaminant from the substance. In one example, removal of the contaminants includes washing or rinsing action. In another example, removal of the contaminants includes dissolving the contaminants. In yet another example, removal of the contaminants includes a combination of washing or rinsing action and dissolving the contaminants.

The method also includes the step 470 of transporting the contaminant away from the substance by suspending the contaminant in a flow of the low surface tension solvent 40. In one example, the low surface tension solvent 40 transports the contaminants away from the substance in suspension within the flow of the low surface tension solvent 40. In another example, the low surface tension solvent 40 dissolves the contaminants and places them in solution within the flow of the low surface tension solvent 40 in order to transport the contaminants away from the substance. With each pass of the low surface tension solvent 40 over the contaminated substance 14, the concentration of the contaminants is constantly reduced. The flow of low surface tension solvent 40 is continued for a predetermined time that is sufficient to dissolve the contaminants from the surface of the substance and remove the contaminants from the substance.

The method further includes the step 480 of reducing the pressure of the low surface tension solvent 40 within the treatment vessel 12 to precipitate the dissolved contaminant. As the pressure within the treatment vessel 12 and the looped pipe line 22, 24 is reduced, the contaminants precipitate out of solution and tend to cling to the walls of the treatment vessel 12, the lines 22, 24 of piping, and other associated fluid handling equipment. The pressure drop can be accomplished by manipulating valve 44 to place the treatment vessel 12 in fluid communication with the particulate collection equipment 48, 54. The particulate collection equipment 48, 54 can collect fine particulate matter from the flow of low surface tension solvent 40. From time to time, the interior walls of the treatment vessel 12 and/or the lines 22, 24 of piping may need to be cleaned to remove the precipitated contaminants.

Example 1

Various Steps are Represented with Lower Case Roman Numerals (i) A powder predominantly consisting of $B^{10}$ was entered into the treatment vessel and sealed. The $B^{10}$ powder was comingled with an amount of undesired contaminants that may have originated from various sources. (ii) Using a pump, a quantity of $CO_2$ was moved from a solvent storage tank through a gas supply line to the treatment vessel until the pressure in the treatment vessel equilibrated with the pressure in the storage tank. This equilibrated pressure was denoted P1. (iii) Using a high pressure pump, additional $CO_2$ was pumped into the treatment vessel until the $CO_2$ within the treatment vessel reached a pressure of about 120 to 130 bars. (iv) After the internal pressure of the treatment vessel reached about 120 to 130 bars, the treatment vessel was sealed from the gas supply line. An induction-operated magnetic stirrer within the treatment vessel was operated to help ensure a flow of $CO_2$ around and through the $B^{10}$ powder and encourage the contaminants to dissolve and become suspended within the flow of $CO_2$. The temperature within the treatment vessel was then raised to 40° C. The final pressure within the treatment vessel was as high as about $3 \times 10^7$ to $3.2 \times 10^7$ Pa (300 to 320 bars). These conditions were held for ten minutes. (v) After the ten-minute period, the magnetic stirrer was turned off, allowing the $B^{10}$ powder particles to settle. An amount of $CO_2$ was then permitted to vent from the treatment vessel until the pressure within the treatment vessel dropped below pressure P1. (vi) Once the pressure dropped below pressure P1, the vent was sealed and the gas supply line was opened again to supply $CO_2$ to the treatment vessel. Using the high pressure pump, additional $CO_2$ was pumped into the treatment vessel until the $CO_2$ within the treatment vessel reached a pressure of about 300 bars. Steps (iv) through (vi) were then repeated ten times.

In the described examples, the apparatus and methods provide a means for removing undesired contaminants from substances such as powdered boron, PTFE fine powder resin, and other substances that are comingled with undesired contaminants. The described examples provide a relatively low-cost option to other methods of removing contaminants from contaminated substances such as the use of chemicals and exposing the contaminated substances to high temperatures to "burn-off" the contaminants. Additionally, the described examples provide a more environmentally friendly method of removing contaminants compared to the previously known methods described. Without using harsh chemicals or burning fuel, the described examples take advantage of the properties of a low surface tension solvent such as $CO_2$ which can be obtained from sources that create it as a by-product, after which the $CO_2$ can be repeatedly recovered and re-used. Furthermore, the described examples provide a relatively easy method to remove contaminants when compared to the previously known methods described.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method for removing contaminants from contaminated material intended for further processing, the method including:
   providing a contaminated material intended for further processing, wherein the contaminated material being comingled with a contaminant;
   exposing the contaminated material to a low surface tension solvent;
   circulating the low surface tension solvent around the exposed surfaces of the contaminated material; and
   removing the contaminant from the contaminated material.

2. The method according to claim 1, wherein the low surface tension solvent has a surface tension of less than 5.0 dynes/cm.

3. The method according to claim 1, wherein the low surface tension solvent is $CO_2$.

4. The method according to claim 1, wherein the low surface tension solvent is supercritical $CO_2$.

5. The method according to claim 1, further including the step of transporting the contaminant away from the contaminated material by suspending the contaminant in a flow of the low surface tension solvent.

6. The method according to claim 5, further including the step of precipitating the dissolved contaminant.

7. The method according to claim 1, wherein the contaminated material is PTFE fine powder resin.

8. A method for removing contaminants from contaminated material intended for further processing, the method including:
   providing a contaminated material intended for further processing, wherein the contaminated material being comingled with a contaminant;
   placing the contaminated material within a treatment vessel;
   exposing the contaminated material to a low surface tension solvent;

increasing the pressure of the low surface tension solvent within the treatment vessel;

circulating the low surface tension solvent around the exposed surfaces of the contaminated substance;

removing the contaminant from the contaminated material;

transporting the contaminant away from the contaminated material by suspending the contaminant in a flow of the low surface tension solvent; and reducing the pressure of the low surface tension solvent within the treatment vessel to precipitate the dissolved contaminant.

9. The method according to claim 8, wherein the low surface tension solvent has a surface tension of less than 5.0 dynes/cm.

10. The method according to claim 8, wherein the low surface tension solvent is $CO_2$.

11. The method according to claim 8, wherein the low surface tension solvent is supercritical $CO_2$.

12. The method according to claim 8, wherein the contaminated material is PTFE fine powder resin.

13. A processing system for removing contaminants from contaminated material intended for further processing, the system including:

a treatment vessel to contain an amount of a contaminated material intended for further processing;

a pump in fluid communication with the treatment vessel to circulate and pressurize a low surface tension solvent;

a means of suspending the contaminated material within the treatment vessel to place the contaminated material within the fluid flow of the low surface tension solvent; and a circuitous piping arrangement that permits a flow of the low surface tension solvent to be cycled through the treatment vessel.

14. The processing system according to claim 13, further including a storage tank that can be in selective fluid communication with the treatment vessel, wherein the storage tank holds a quantity of low surface tension solvent and quantities of low surface tension solvent can be transferred to the treatment vessel while the pressure within the storage tank and the treatment vessel equilibrate.

15. The processing system according to claim 14, further including particulate collection equipment that can be in selective fluid communication with the treatment vessel, wherein the particulate collection equipment can remove a quantity of contaminants from a flow of low surface tension solvent.

16. The processing system according to claim 13, wherein the means of suspending the contaminated material includes a fine mesh bag.

17. The processing system according to claim 16, wherein the fine mesh bag has a maximum pore size of 0.5 micrometers ($1.97 \times 10^{-5}$ inches).

18. The processing system according to claim 16, wherein the fine mesh bag is composed of ePTFE.

19. The method according to claim 1, wherein the contaminated material is boron powder.

20. The method according to claim 8, wherein the contaminated material is boron powder.

* * * * *